UNITED STATES PATENT OFFICE.

WILLIAM W. WHEELER, OF MERIDEN, CONNECTICUT.

PROCESS OF AMALGAMATING GOLD AND SILVER.

SPECIFICATION forming part of Letters Patent No. 378,750, dated February 28, 1888.

Application filed October 8, 1884. Serial No. 145,011. (No specimens.)

*To all whom it may concern:*

Be it known that I, WILLIAM W. WHEELER, a citizen of the United States, residing at Meriden, in the county of New Haven and State of Connecticut, have invented certain new and useful Improvements in Processes of Amalgamating Gold and Silver; and I do hereby declare that the following is a full, clear, and exact description of the invention, which will enable others skilled in the art to which it appertains to make and use the same.

It is a well-known fact that many gold ores of great value have the particles of gold so finely divided that the atoms are so light as not to precipitate readily when placed in a solution, and also that they are so contaminated, or, as the common term is, so "rusty" that they will not amalgamate readily with mercury, and in most mining processes by amalgamation such atoms are lost, amounting in the aggregate to large values.

My invention consists in acting on all gold present chemically so as to bring all the gold present in the ore in perfect contact with mercury, and at the same time to increase the weight of each atom or particle of gold by adding to its bulk an easily-amalgamated metal and mercury, and to keep the mercury in a condition so that it will not flour, but always be in a proper condition to amalgamate with any gold or any other amalgam with which it may come in contact. My method for accomplishing this is based on the reducing power of glucose or its equivalent (its equivalent being any of the organic compounds belonging to the alcohol group, which by the action of a caustic alkali liberates hydrogen—as, for example, maltose, levulose, mannitose, &c.,) and a caustic alkali on the soluble salts of metals, and also on the principle that copper and mercury both being dyad metals they form similar compounds, only the copper under the same circumstances will form compounds and flour and be lost before the mercury, thereby leaving the quicksilver in a condition to do its work properly.

While the above substances are essential to my process, there are others which I use to assist. While not being wholly essential, they are of so much assistance that I would advise their use.

To work the process I take the ore that has been oxidized by nature or artificial means, (heat,) and I prefer that it shall be pulverized dry and put it in a suitable amalgamating-pan where heat can be applied by injecting steam. Use sufficient water to make a thin pulp, turn on the steam, and set the pan in motion. Then I add salt, (chloride of sodium,) bichloride of mercury, sulphate of copper, glucose, and pure mercury. After the salts have become dissolved and the ingredients throughly mixed with the ore and quite hot, I add caustic soda. There will be some amalgamation and some precipitation before the caustic soda is added; but a great saving is attained by the addition of the latter. The glucose is oxidized by the caustic alkali and heat, hydrogen is set free, which, with the assistance of the salts formed by the chemical changes and the metallic iron present in the substance of the pan, acts on the mercury and copper salts, eventually reducing them to metallic copper and mercury, but in a very finely-divided state, and as the action takes place in every part of the pulp every particle of matter has come in contact with mercury and copper; hence every particle of gold has been in condition to amalgamate with the amalgam chemically formed from the copper and mercury salts, and one particle of amalgam, uniting with another, the bulk and weight increases until the whole settles to the bottom of the pan with the body of the quicksilver. After this precipitation takes place the final amalgamation is hastened and assisted by the addition of cyanide of potassium; but this must be added after the precipitation has taken place, for if added before it would have a tendency to hold the copper and mercury in solution. Sometimes a little chloride of ammonium added at this point assists.

The amount of chemical used will depend largely on the ore used; but I should recommend for a naturally-oxidized ore about the following proportions: To one ton, salt, five pounds; bichloride of mercury, one pound; sulphate of copper, two pounds; glucose, six pounds; caustic soda, four pounds; cyanide of potassium, one-half pound. If the mercury flours, more copper salts must be added.

When the mercury is pressed and the amalgam ball obtained and retorted, a portion of the bullion may be copper; but this can be separated in the usual way.

I prefer to use glucose rather than any other of the group, because it is cheaper and more sure in its action.

I am aware that various prior patents and printed publications describe the use of copper and iron salts, mercury, hyposulphate of soda, common salt, and cyanides in treating ores, and I hereby disclaim the same; but I believe that none of the prior art in the treatment of ores shows the use of glucose in any way, nor the use of caustic alkali, by means of which I attain the results hereinbefore set forth.

I claim as my invention—

1. In the process of amalgamating metals, the method herein described, which consists in subjecting the ores in the form of pulp containing the precious metals to the action of soluble metallic salts and adding thereto aldehyde alcohol—as, for instance, glucose—substantially as described.

2. In the process of amalgamating metals, the method herein described, which consists in subjecting the ores in the form of pulp containing the precious metals to the action of soluble metallic salts and adding thereto aldehyde alcohol—as, for instance, glucose—and then adding a caustic alkali, substantially as described.

In testimony whereof I have affixed my signature in presence of two witnesses.

WILLIAM W. WHEELER.

Witnesses:
E. A. MERRIMAN,
A. W. GRACEY.